J. D. JONES.
LUBRICATING SYSTEM FOR EXPLOSIVE ENGINES.
APPLICATION FILED JAN. 27, 1917. RENEWED SEPT. 22, 1919.
1,355,229.
Patented Oct. 12, 1920.
2 SHEETS—SHEET 2.
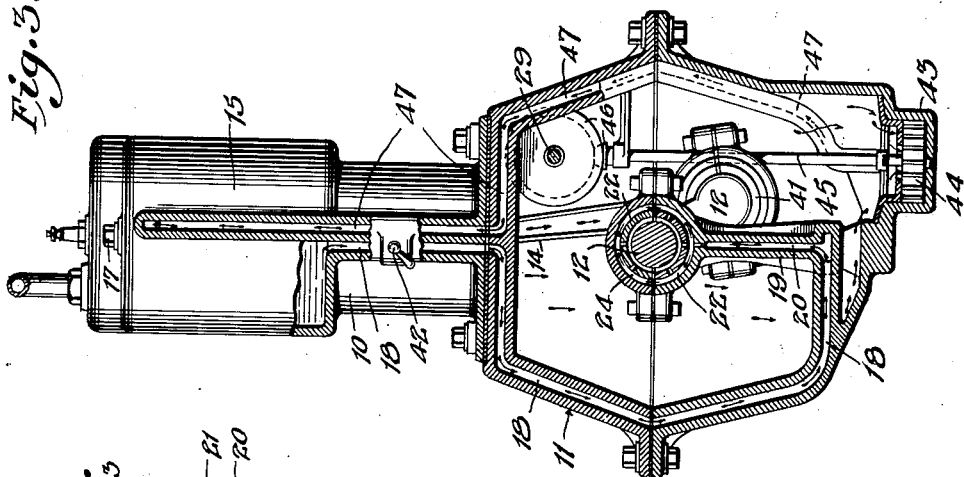
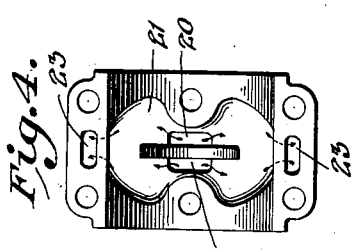
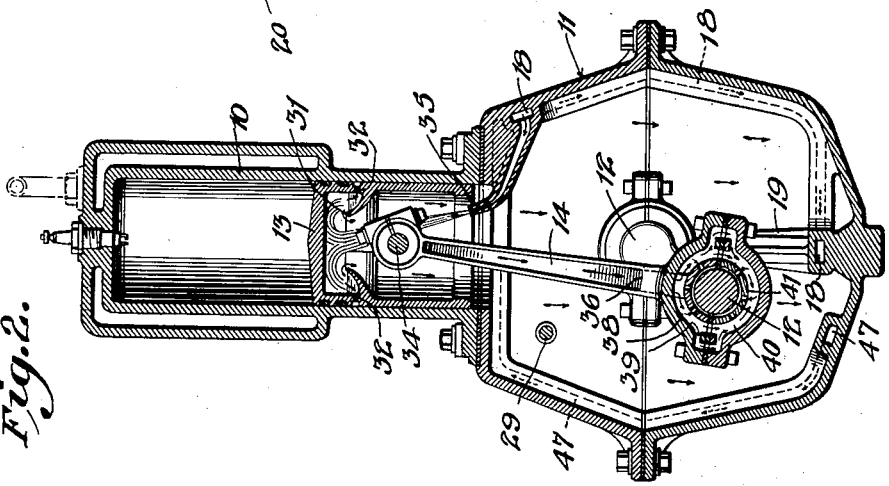
Inventor
John D. Jones
Attorneys

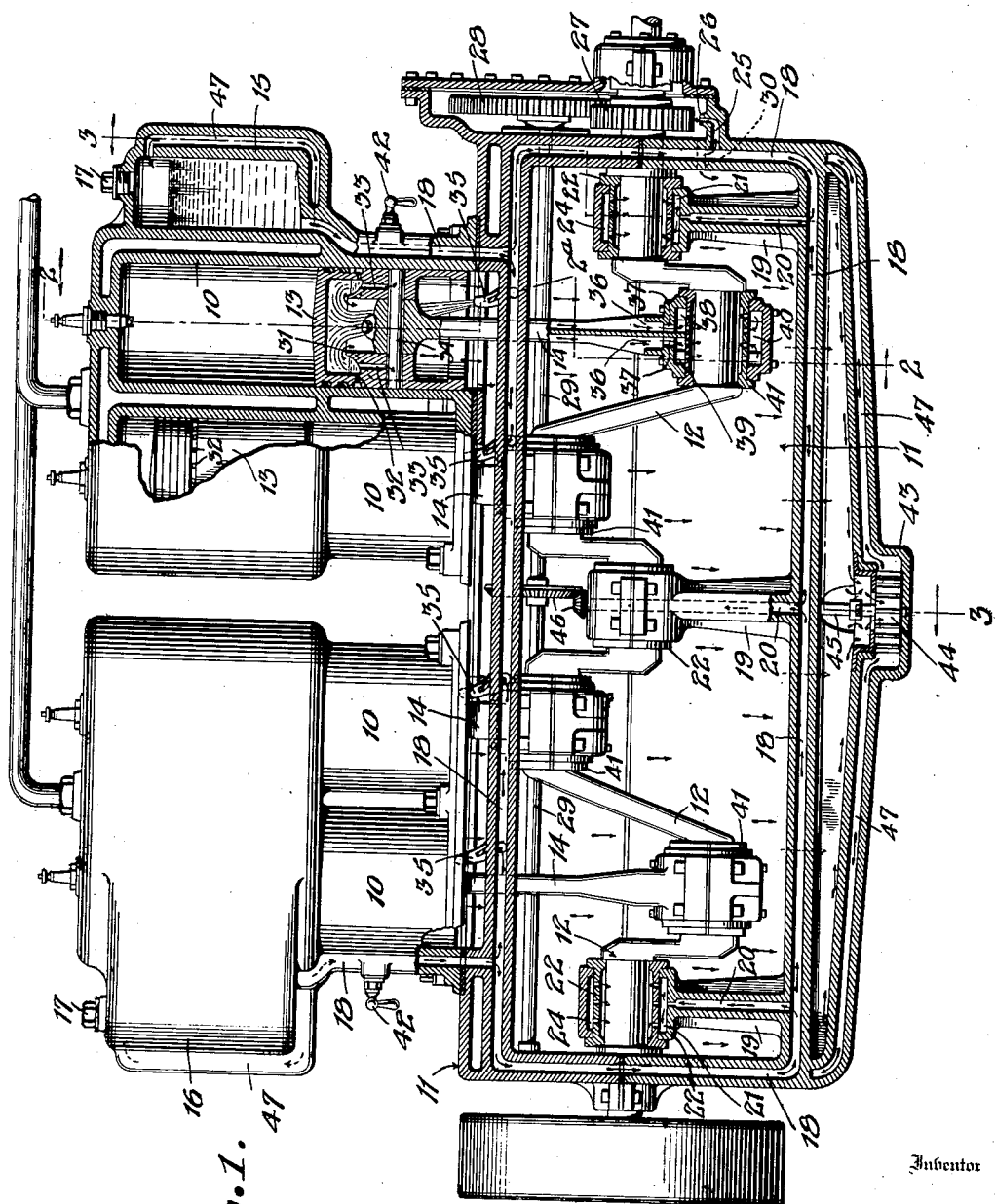

UNITED STATES PATENT OFFICE.

JOHN D. JONES, OF WALLA WALLA, WASHINGTON.

LUBRICATING SYSTEM FOR EXPLOSIVE-ENGINES.

1,355,229.     Specification of Letters Patent.     Patented Oct. 12, 1920.

Application filed January 27, 1917, Serial No. 144,962. Renewed September 22, 1919. Serial No. 325,490.

*To all whom it may concern:*

Be it known that I, JOHN D. JONES, a citizen of the United States, residing at Walla Walla, in the county of Walla Walla and State of Washington, have invented certain new and useful Improvements in Lubricating Systems for Explosive-Engines; and I do hereby declare the following to be a full, clear, and exact description of the invention, such as will enable others skilled in the art to which it appertains to make and use the same.

This invention relates to lubricating systems for explosive engines, and has for an object to provide a system embodying improved means for supplying the lubricant to all of the bearings and moving parts receiving the direct power, and whether or not the engine is maintained in a horizontal plane or otherwise.

It has been demonstrated that in the use of explosive engines running through long periods of time without stopping, and subject to various tiltings as, for instance, in use in aeroplanes, agricultural implements and the like, some of the bearings do not receive sufficient lubrication and are quickly and speedily cut out. It has also been demonstrated that the engines which "run in oil" also fail to lubricate properly, the reason believed to be that the excessively rapid movement of the several parts in the oil bath serve to whip the oil and churn it, aerating it into a foam which thereby loses its lubricating qualities.

It is the object of the present invention to supply oil in oily condition to all of the bearings of such an engine in sufficient quantities to sufficiently lubricate and cool the bearings no matter what the position of the engine and without subjecting the oil to the whipping and churning action of the moving parts as in an ordinary lubricating system.

With these and other objects in view, the invention comprises certain novel features of construction, combination and arrangement of parts as will be hereinafter more fully described and claimed.

In the drawings:—

Figure 1 is a view of a conventional engine of the explosive type, for convenience being shown as a four-cylinder engine, with part of the casing being broken away to show the several lubricating oil conduits and appliances.

Fig. 2 is a transverse section of the improved engine taken on line 2—2 of Fig. 1, with an irregular offset at $2^a$, as shown.

Fig. 3 is a transverse sectional view taken on the irregular line 3—3 of Fig. 1.

Fig. 4 is a plan view of the end of one of the connecting rods or pillar bearings, showing the oil receptacles.

Like characters of reference designate corresponding parts throughout the several views.

The improved engine which forms the subject-matter of this application comprises the usual and ordinary cylinders 10, carried upon the crank casing 11. Within the crank casing is mounted substantially the usual and ordinary crank shaft 12.

Within the several cylinders 10 pistons 13 are mounted, such pistons specifically forming no part of the present application, but being disclosed in a co-pending application Serial Number 141,239. The said pistons 13 are also connected with the crank shaft 12 by means of connecting rods 14, which connecting rods specifically are also the subject-matter of a co-pending application Serial Number 143,771, and as such form no part of the present invention.

Mounted at some elevated position upon the engine, as for instance, upon the opposite end adjacent to the extreme cylinders 10, are reservoirs 15 and 16 having charging openings conveniently located, and closed air-tight by closures 17.

From the reservoirs 15 and 16 conduits 18 lead, preferably cast integral, into the material of the casing. The conduits 18 extend downwardly from both of such reservoirs, and are in communication throughout the entire casing so that whichever end of the engine may be higher one of the reservoirs 15 or 16 is always sufficiently high to furnish by gravity a flow of the lubricating oil to lubricate all of the parts.

Within the crank casing pillars 19 are erected having conduits 20 communicating with the conduits 18. At their upper ends the pillars contain chambers 21 proportioned to receive the perforate "brasses" 22, passages 23 (see Fig. 4) being provided to communicate with a like chamber 24 above the shaft, so that the brass 22 is wholly surrounded by a body of oil supplied and maintained in position through the conduit 20. The branch conduit 25 also communicates with the conduit 18 and is provided with a nozzle 26 directed toward the gear 27 carried upon the crank shaft 12, which gear 27 meshes with the gear 28 upon the cam-shaft 29, which cam-shaft is only conventionally shown, the cam connection being omitted. The nozzle 26 supplies lubricant to the gears 27 and 28, and is permitted to flow back into the casing through the passage 30.

The pistons 13 are provided with upturned annular flanges 31 forming a receptacle for the receipt of oil as the cooling body at the upper end of such pistons, and providing passages 32 for the oil to pass through the outer periphery of the piston, and also passages 33 for the oil to pass for lubricating the wrist-pin 34. As previously stated, the arrangement of this piston is not a part of the present invention, but the matter of introducing oil to said piston is part of the present invention and comprises nozzle 35 communicating with the conduit 18 adapted to traject the lubricant upwardly through the annulus of the flange 31 into the receptacle formed thereby, as indicated at Figs. 1 and 2. Not all of the oil trajected from the nozzle 35 will pass upwardly through such annulus, some being received upon the connecting rod 14, down which it will run into the pockets 36, which pockets are provided with passages 37 communicating with the chamber 38 formed at the end of such connecting rod. The formation of the end of the connecting rod and the chamber are substantially identical with the formation of the chamber 21 in the upper end of the pillars 19, and is sufficiently accurately shown at Fig. 4. The chamber 39 also communicates with chamber 40, which said combined chambers 39 and 40 entirely surround the brass 41 perforated as indicated at Figs. 1 and 2, to cool and lubricate the bearing of the connecting rod upon the crank shaft. To control the flow of oil through the conduits 18, cocks 42 are preferably provided, but as means is provided for producing a constant circulation of the oil, the use of said cocks may usually be disregarded, but may if found desirable be closed when the engine is stopped.

To provide for a return of the lubricant to the reservoirs 15 and 16, the crank casing is provided with inclined sides and bottom as indicated at Figs. 1, 2 and 3, with a sump 43 so positioned as to finally receive the flow of all of the oil dripping from or discharged from any of the lubricating devices or lubricated parts, as indicated by the arrows. Within the sump 43, or at such point as may be found convenient, a pump is located being conventionally shown at 44, driven by means of a shaft 45 from any convenient source of power as the cam-shaft 29 by any usual and ordinary transmission mechanism as the bevel-gears 46. From the sump 43 and the pump 44, conduits 47 branch in opposite directions and, being preferably cast into the material of the casing as is the conduit 18, lead back to the reservoirs 15 and 16, discharging preferably, though not necessarily, into such reservoirs adjacent the top. The pump being driven, the oil being in heated and therefore liquefied condition is driven by such pump more readily backwardly through the conduits 47 into the reservoirs 15 and 16, and in such reservoirs has opportunity to become somewhat cool and to return from its aerated to its ordinary oleaginous condition. The forcing of the oil into the reservoirs 15 and 16 also preferably places the oil contents therein under pressure, whereby it is forced under such pressure through the several conduits especially forming the trajectory discharge from the nozzle 35 upwardly into the pistons.

In putting the device into operation, of course, the closures 17 are removed and the reservoirs 15 and 16 filled with oil, the oil running down through the conduits 18 and through the several branch conduits and nozzles to entirely fill the system. When filled, the cocks 42 may be closed if desired, and the filling of the reservoirs 15 and 16 continued to the desired extent. The system being now filled with oil, the engine is started in the usual manner, and the cocks 42 opened, whereupon the oil will continue to be supplied to all of the several bearings and moving parts, and as soon as it is discharged into the sump 43 will be by the pump 44 returned to the reservoirs 15 and 16 placing the oil contents therein under additional pressure to facilitate the additional discharge.

When the engine is at rest the oil continuing to drip into the sump 43 will close the conduit 47, whereby the air will be trapped in the reservoirs 15 and 16 forming a partial vacuum therein which will prevent the complete emptying of such reservoirs while the engine is at rest. If the engine is to remain at rest for a great length of time, it may be found desirable to close the cocks 42, although for ordinary stopping periods the resistance of the partial vacuum within the reservoirs 15 and 16 will be found ample to resist the outflow of the oil.

What I claim as new is:

1. In a system of lubricating internal combustion engines embodying normally horizontal crank-shafts, separate tanks located substantially above opposite ends of the crank-shaft, and a common conduit communicating with said tanks and conducting lubricant to the parts to be lubricated.

2. In a lubricating system for combustion engines, embodying normally vertical cylinders and reciprocating pistons therein, supplied with oil-receiving receptacles, of oil tanks located at spaced intervals, a common conduit connecting said tanks, and nozzles communicating with said conduit positioned to traject oil upwardly into the receptacle of the pistons.

3. In a lubricating system for combustion engines embodying a normally horizontal crank-shaft, and normally vertical cylinders with pistons reciprocating therein, with connecting rods connecting said pistons and crank-shaft, said connecting rods being provided with oil-receiving pockets adjacent the bearings, of a source of oil supply, conduits leading from the source of oil supply adjacent the cylinders, and a nozzle communicating with said conduits positioned to traject oil upwardly into the cylinders and against the connecting rods.

4. In an explosive engine embodying normally vertical cylinders and reciprocating pistons therein, said reciprocating pistons being provided with oil-containing reservoirs at their upper ends, nozzles positioned to traject oil upwardly into the receptacles, conduits communicating with the nozzles, and a source of oil supply communicating with the conduits positioned to maintain a constant pressure at the nozzles.

5. In an explosive engine embodying a crank casing, a crank-shaft rotatable within the casing, and cylinders communicating with the casing; of nozzles positioned adjacent the cylinders, and conduits formed integral with the walls of the crank casing communicating with the nozzles and leading to the crank shaft.

6. In an explosive engine embodying a crank casing, cylinders communicating with the crank casing, and a crank-shaft rotatable within the crank casing; of nozzles positioned adjacent the cylinders, lubricating reservoirs formed integral with the casing, and conduits formed integral with the casing and leading from the reservoirs to the nozzles, and leading to the crank shaft.

7. In a system for lubricating combustion engines having a normally horizontal crank shaft, of a supply of lubricant at both ends maintained at an elevation above the opposite ends of the crank shaft, and means to conduct the lubricant from either end to the parts to be lubricated.

8. In a lubricating system for combustion engines embodying a normally horizontal crank shaft, of reservoirs located substantially above the opposite ends of the crank shaft, means to conduct lubricants from either of said tanks through a common conduit to the parts to be lubricated, and means to return the overflow of lubricant to the tanks.

9. In a lubricating system for combustion engines embodying a normally horizontal crank shaft, of a pillar carrying a bearing supporting said crank shaft, said bearing having an annular oil chamber surrounding the crank shaft, and said pillar being provided with a conduit leading upward through the under side of said bearing and communicating with said annular oil chamber, and a reservoir communicating with said conduit.

10. In a system for lubricating combustion engines embodying a normally horizontal crank shaft, pillars rising from the base and carrying bearings at their upper ends to accommodate the said crank shaft, said pillars being provided with conduits, a common conduit communicating with all said pillar conduits, and a reservoir at each end above the crank shaft communicating with the common conduit.

11. In an explosive engine embodying normally vertical cylinders and reciprocating pistons therein, said reciprocating pistons being provided with oil-containing reservoirs at their upper ends, of a source of oil supply a conduit leading from said source of oil supply to adjacent cylinders, and nozzles communicating with said conduits positioned to traject oil upwardly into the reservoirs on the pistons.

12. In a lubricating means for internal combustion engines, the combination of a cylinder, piston, connecting rod and crank shaft, said piston having an oil reservoir within it, an oil pocket on the connecting rod above the crank pin, and common means for supplying oil to both said piston reservoir and said oil pocket on the connecting rod.

13. In a system for lubricating combustion engines embodying a normally horizontal crank shaft, of air tight tanks located above the ends of the crank shaft, conduits leading from the tanks to the lubricating applicators, a pump, means to conduct the overflow lubricant to the pump, and branched conduits leading from the pump to said air-tight tanks.

14. In a lubricating system for combustion engines, a plurality of spaced air-tight tanks, a common conduit leading from said spaced tanks to the parts to be lubricated, a pump, means to conduct the overflow lubricant to the pump, and branched conduits leading from the pump to the tanks.

15. In an internal combustion engine having a plurality of alined jacketed cylinders, an oil reservoir formed integral with the jackets of the front and rear cylinder, respectively, said reservoirs having delivery conduits communicating with each other and with the parts to be lubricated.

16. In an internal combustion engine, a crank casing embodying integral lubricant conduits, and spaced reservoirs at opposite ends of the engine on a level to maintain the lubricant therein higher than the crank shaft in said reservoirs communicating with the conduits.

17. In an oiling system for internal combustion engines, a base comprising a crank case, a plurality of alined jacketed cylinders thereon, oil reservoirs formed integral with the front and rear cylinders, said front and rear cylinders having oil feeding conduits formed in their walls leading from said reservoirs, and said base having a conduit connecting said oil feeding conduits formed integrally in its walls, and other conduits formed integrally in said base adapted to distribute the oil to parts to be lubricated therein.

18. In an oiling system for internal combustion engines, a base, front and rear cylinders thereon, a fluid tight oil reservoir forward and rearward of said front and rear cylinders, respectively, said reservoirs having oil feeding conduits connected by a common distributing conduit for distributing oil to the parts to be lubricated, a collecting reservoir for used oil, conduits connecting said collecting reservoir with said fluid tight oil reservoirs and a means for forcing oil from said collecting reservoir through said conduits to said fluid tight oil reservoirs.

In testimony whereof I affix my signature.

JOHN D. JONES.